US006892880B2

(12) United States Patent
Nieves (10) Patent No.: US 6,892,880 B2
(45) Date of Patent: May 17, 2005

(54) PDA HOLDING UNIT AND HOLDING CASE

(75) Inventor: Julian Nieves, New York, NY (US)

(73) Assignee: Motion Systems, LLC, New York, NY (US)

( * ) Notice: Subject to any disclaimer, the term of this patent is extended or adjusted under 35 U.S.C. 154(b) by 72 days.

(21) Appl. No.: 10/379,618

(22) Filed: Mar. 5, 2003

(65) Prior Publication Data

US 2004/0173482 A1 Sep. 9, 2004

(51) Int. Cl.$^7$ .............................. B65D 85/00; H05K 5/00
(52) U.S. Cl. ....................... 206/320; 206/305; 248/118; 248/309.1; 248/316.7
(58) Field of Search ................................ 206/305, 320; 248/309.1, 316.1, 316.7, 316.8; 361/683, 686

(56) References Cited

U.S. PATENT DOCUMENTS

| | | | | |
|---|---|---|---|---|
| 4,259,568 A | * | 3/1981 | Dynesen ..................... | 235/1 D |
| 5,374,018 A | * | 12/1994 | Daneshvar .................. | 248/118 |
| 5,718,104 A | * | 2/1998 | Kennedy ..................... | 53/491 |
| 5,884,768 A | * | 3/1999 | Fox ............................. | 206/522 |
| 5,996,956 A | * | 12/1999 | Shawver ................... | 248/309.1 |
| 6,026,961 A | * | 2/2000 | McCarthy et al. .......... | 206/576 |
| 6,206,187 B1 | * | 3/2001 | Van Winkle ................ | 206/320 |
| 6,264,029 B1 | * | 7/2001 | Motson ....................... | 206/320 |
| 6,520,466 B1 | * | 2/2003 | Blanchard et al. ........ | 248/309.1 |
| 6,536,589 B2 | * | 3/2003 | Chang ......................... | 206/320 |
| 6,758,335 B2 | * | 7/2004 | Kajiya ......................... | 206/320 |
| 6,772,879 B1 | * | 8/2004 | Domotor .................... | 206/320 |
| 6,781,522 B2 | * | 8/2004 | Sleva et al. .............. | 340/870.1 |

* cited by examiner

Primary Examiner—Bryon P. Gehman
(74) Attorney, Agent, or Firm—Ezra Sutton, Esq.

(57) ABSTRACT

A PDA holding unit and holding case therefor, for securing and holding in place a personal digital assistant (PDA) device. The PDA holding unit includes a base member having an upper surface for receiving and holding a PDA device and a lower surface. The upper surface having a plurality of gripping elements thereon for frictionally engaging the PDA device. The PDA holding unit also includes a first gripping arm movably attached to a first side of the base member for engaging and holding the PDA device in place on the base member; and a second gripping arm attached to a second side of the base member for engaging and holding the PDA device in place on the base member. The PDA holding unit further includes third and fourth gripping arms attached to one end of the base member for engaging and holding the PDA device in place on the base member. The holding case includes a base section and a cover section which are foldable relative to each other to close the holding case, wherein the lower surface of the base member is attached to the base section via mounting fasteners for holding the base member in place within the holding case.

17 Claims, 8 Drawing Sheets

PDA HOLDING UNIT AND HOLDING CASE

FIELD OF THE INVENTION

The present invention relates to a PDA holding assembly for holding a PDA device therein. More particularly, the PDA holding assembly includes a PDA holding unit and a holding case, such that the holding unit detachably secures the PDA device in place and the holding case covers and protects the PDA device therein. A PDA unit is defined as a personal digital assistant unit.

BACKGROUND OF THE INVENTION

Holding assemblies for electronic equipment such as cellular phones, Palm Pilots, PDA devices and carrying (holding) cases for the aforementioned electronic equipment are known in the art. These holding assemblies and holding cases have various designs, configurations and structures allowing the user to conveniently store the electronic device when not in use or use the electronic equipment/device anytime or anywhere by having the electronic holding assembly at the user's site being a vehicle, an office, a store, or at home, etc. Many of these holding assemblies and carrying cases are not adequately designed for holding the electronic device securely, and the holding case does not properly protect the electronic device being stored or carried therein.

There remains a need for a holding assembly that provides a secure holding bracket to hold and protect a PDA device within a portable holding/carrying case. More particularly, the holding bracket should include a base member having a non-slip gripping surface to prevent any movement or damage to the PDA device being held securely within the holding bracket and the holding case.

DESCRIPTION OF PRIOR ART

Holding assemblies for holding an electronic device within a holding case having various designs, configurations, structures, and materials of construction have been disclosed in the prior art. For example, U.S. Pat. No. 6,285,758 to Lu discloses a mobile phone holder that is able to adjust its size by a disk having a first plate and a second plate that move simultaneously relative to each other. The mobile phone holder is readily adjustable so as to receive different sizes of mobile phones. This prior art patent does not teach or disclose the structure and configuration of the PDA holding assembly of the present invention.

U.S. Pat. No. 5,778,202 to Richter discloses a support device for supporting a mobile telephone in a vehicle. The support device includes a base body having two retaining walls wherein at least one retaining wall is moveable from a release position via a pivot spring mechanism. This prior art patent does not teach or disclose the structure and configuration of the PDA holding assembly of the present invention.

U.S. Pat. No. 5,694,468 to Hsu discloses a cradle for a radio telephone or a mobile phone. The cradle includes a main body having two (2) side arms or side walls that are laterally moveable relative to each other. This prior art patent foes not teach or disclose the structure and configuration of the PDA holding assembly of the present invention.

U.S. Pat. No. 5,457,745 to Wang discloses an adjustable mobile phone holder having two (2) movable side walls and a movable bottom wall. The mobile phone holder is adjustable in depth, width, and length for any size mobile phone. This prior art patent does not teach or disclose the structure and configuration of the PDA holding assembly of the present invention.

U.S. Pat. No. 5,305,381 to Wang et al. discloses a cradle for a cellular telephone having ratcheted, sliding walls which engage a cellular telephone and hold it securely in place. This prior art patent does not teach or disclose the structure and configuration of the PDA holding assembly of the present invention.

None of the prior art patents disclose or teach a PDA holding assembly having a PDA holding unit and a holding case therefor. Further, no prior art patent has a PDA holding unit having a base member with a plurality of gripping elements thereon that are configured in a grid dot pattern for forming a non-slip gripping surface.

Accordingly, it is an object of the present invention to provide a PDA holding assembly having a built-in PDA holding unit for securely holding in place a PDA (a personal digital assistant) device or unit within a carrying holding case.

Another object of the present invention is to provide a PDA holding unit having a base member with a moveable and extendable gripping arm and a non-movable gripping arm for securing and holding the PDA unit within the gripping arms.

Another object of the present invention is to provide a PDA holding unit that includes a grid dot pattern of multiple gripping elements for forming a non-slip gripping surface on the upper surface of the base member in order to secure and protect the PDA unit being held within its holding case.

Another object of the present invention is to provide a PDA holding unit with gripping arms that each have a cushion pad thereon for protecting and stabilizing the PDA unit being held within its holding case.

Another object of the present invention is to provide a holding case that is capable of holding and securing office supplies and implements within the holding case such as a notepad, a pen, and a stylus for the convenience of the user when using the PDA holding assembly and the PDA unit therein.

Another object of the present invention is to provide a carrying/holding case that is foldable and convenient to carry, and is closed by a flap closure or zipper closure.

A further object of the present invention is to provide a PDA holding assembly that is lightweight, durable, and easy to use.

A still further object of the present invention is to provide a PDA holding assembly that can be mass produced in an automated and economical means and is readily affordable by the user.

SUMMARY OF THE INVENTION

In accordance with the present invention, there is provided a PDA holding unit and holding case therefor. The PDA holding unit includes a base member having an upper surface for receiving and holding a PDA device thereon and a lower surface. The upper surface has a plurality of gripping elements thereon for frictionally engaging the PDA device. The PDA holding unit also includes a first gripping arm movably attached to a first side of the base member for engaging and holding the PDA device in place on the base member; and a second gripping arm attached to a second side of the base member for engaging and holding the PDA device in place on the base member. The PDA holding unit further includes third and fourth gripping arms attached to one end of the base member for engaging and holding the PDA device in place on the base member. The holding case includes a base section and a cover section which are foldable relative to each other to close the holding case, wherein the lower surface of the base member is attached to the base section for holding the base member in place within the holding case.

BRIEF DESCRIPTION OF DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENTS

First Embodiment 10

Figure 1:
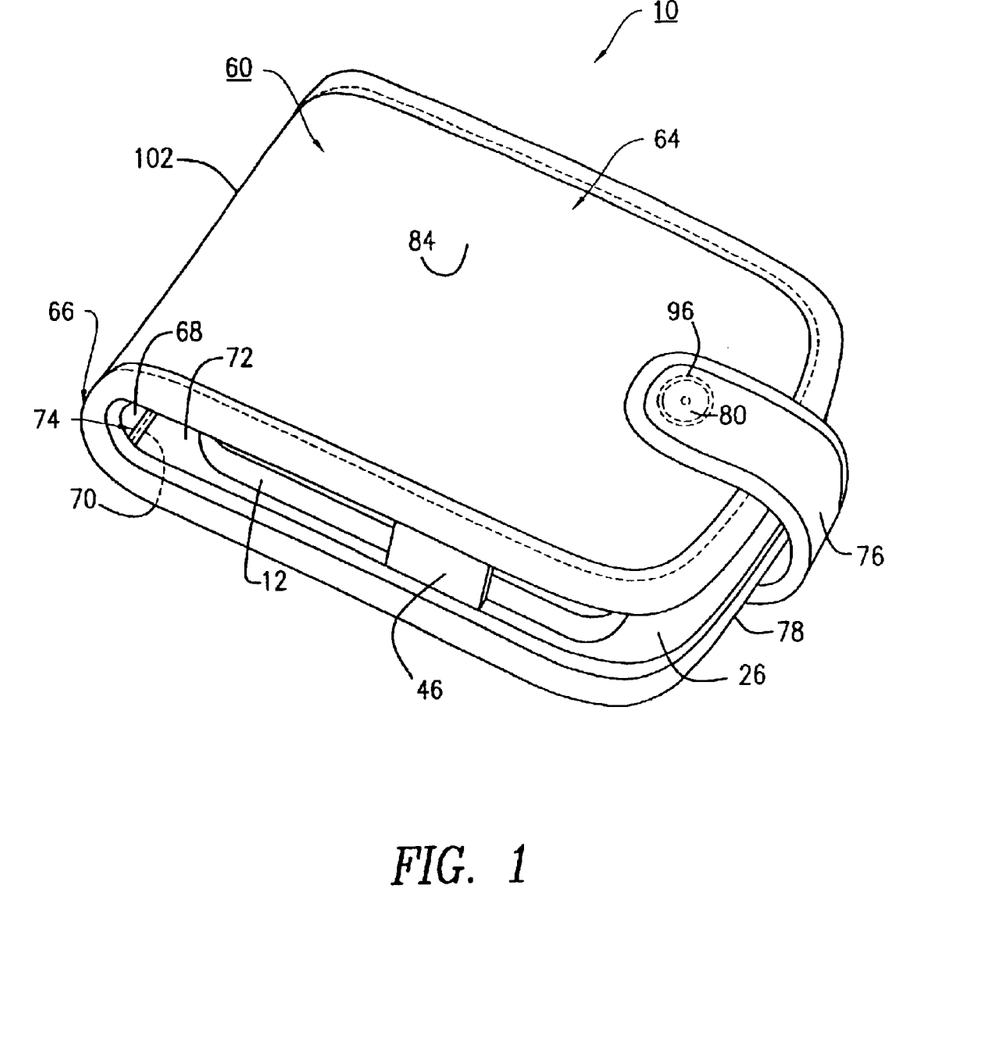
FIG. 1 is a perspective view of the PDA holding assembly of the first embodiment of the present invention showing the PDA holding assembly in a closed configuration.
Figure 2:
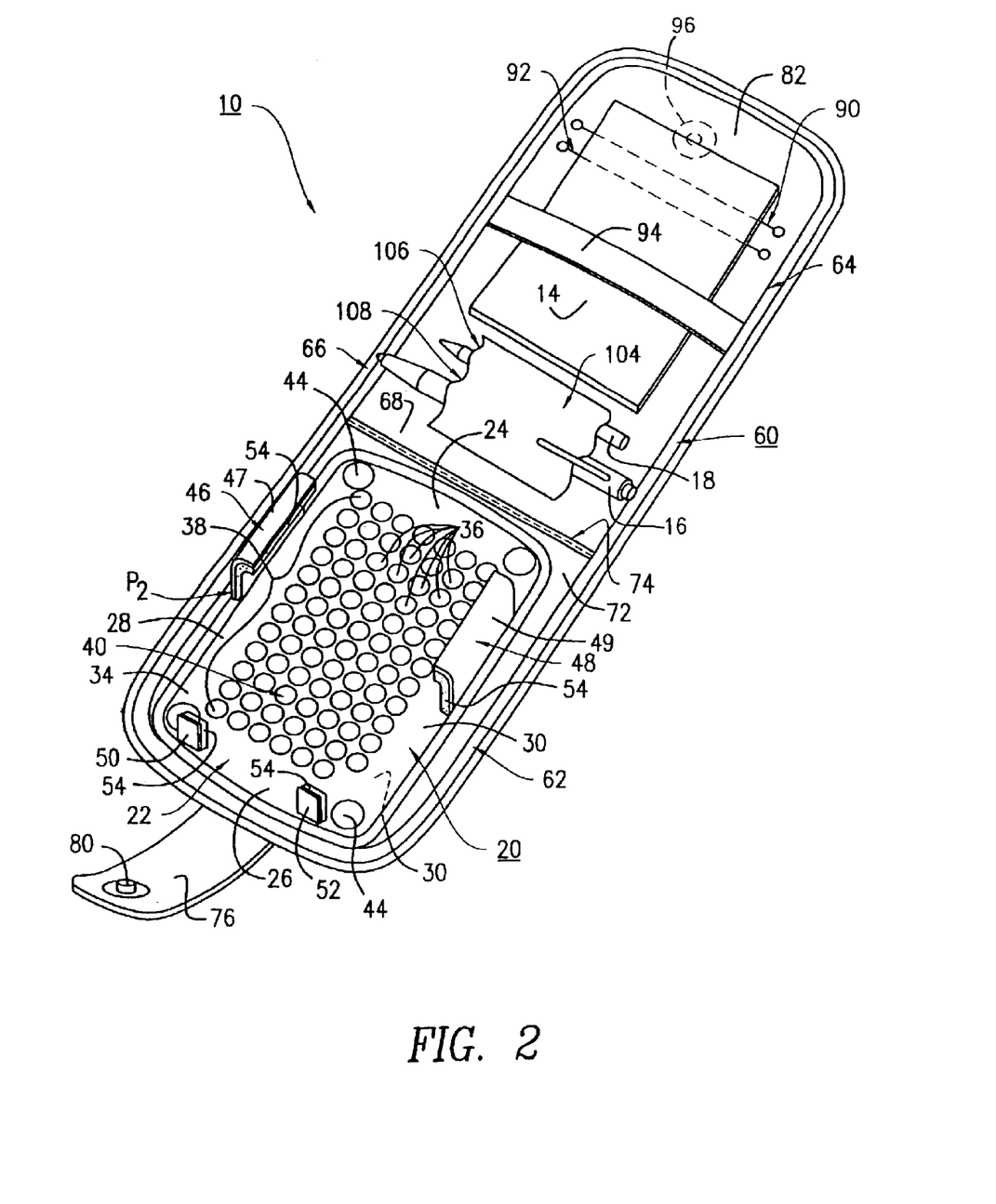
FIG. 2 is a perspective view of the PDA holding assembly of the present invention showing a PDA holding unit and a holding case in an opened configuration and in operational use thereof.

The PDA holding assembly 10 and its component parts of the first embodiment of the present invention are represented in detail by FIGS. 1 through 5 of the patent drawings. The PDA holding assembly 10, as shown in FIGS. 1 and 2, includes a PDA holding unit 20 and a holding case 60 for securing and holding in place a personal digital assistant (PDA) unit 12, a notepad 14, a pen 16, and a stylus 18 therein.

The PDA holding unit 20 includes a base member 22 having an upper end 24, a lower end 26, a first (left) side 28, a second (right) side 30, a bottom lower surface 32, and an upper surface 34 for receiving and holding the PDA device 12 thereon. The upper surface 34 includes a plurality of gripping elements 36 thereon for functionally engaging the PDA device 12 thereon. The plurality of gripping elements 36 are configured in a grid dot pattern 38 for forming a non-slip gripping surface 40. The base member 22 further includes mounting openings 42a, 42b, 42c, and 42d for receiving attaching bolts 44 therethrough for mounting the base member 22 within the holding case 60. Attaching bolts 44 can also be screws, fasteners, and the like.

Figure 3:
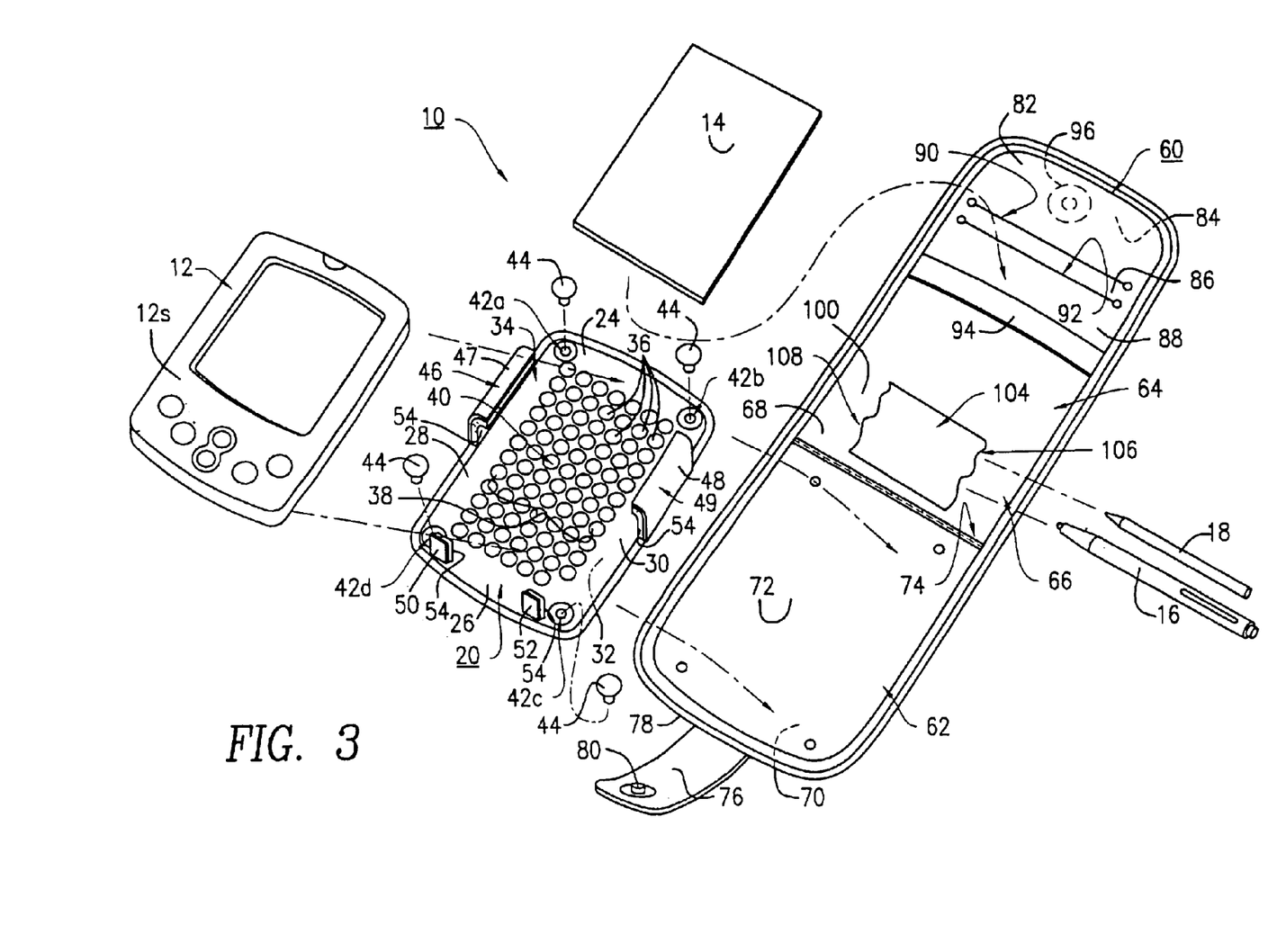
FIG. 3 is an exploded perspective view of the PDA holding assembly of the present invention showing the major component parts thereto.
Figure 4:
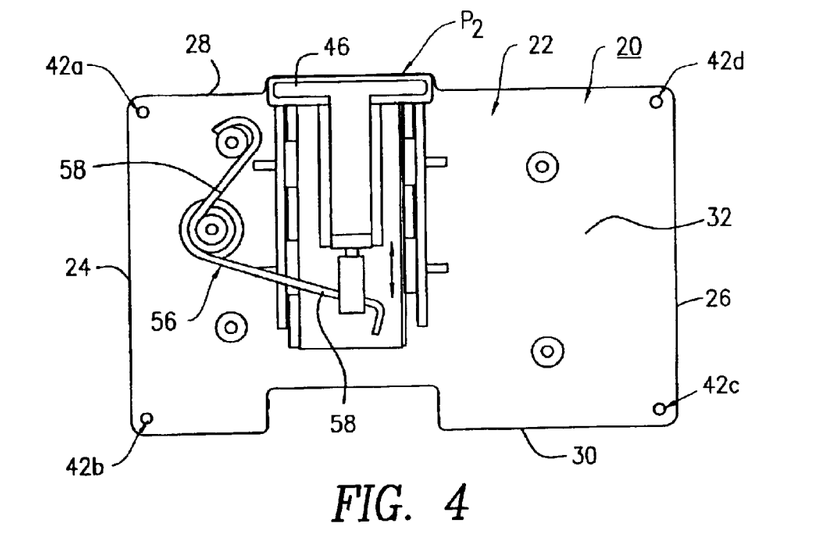
FIG. 4 is a rear plan view of the PDA holding unit of the present invention showing a spring leaf mechanism attached to a first gripping arm of a base member in a closed and unextended position.
Figure 5:
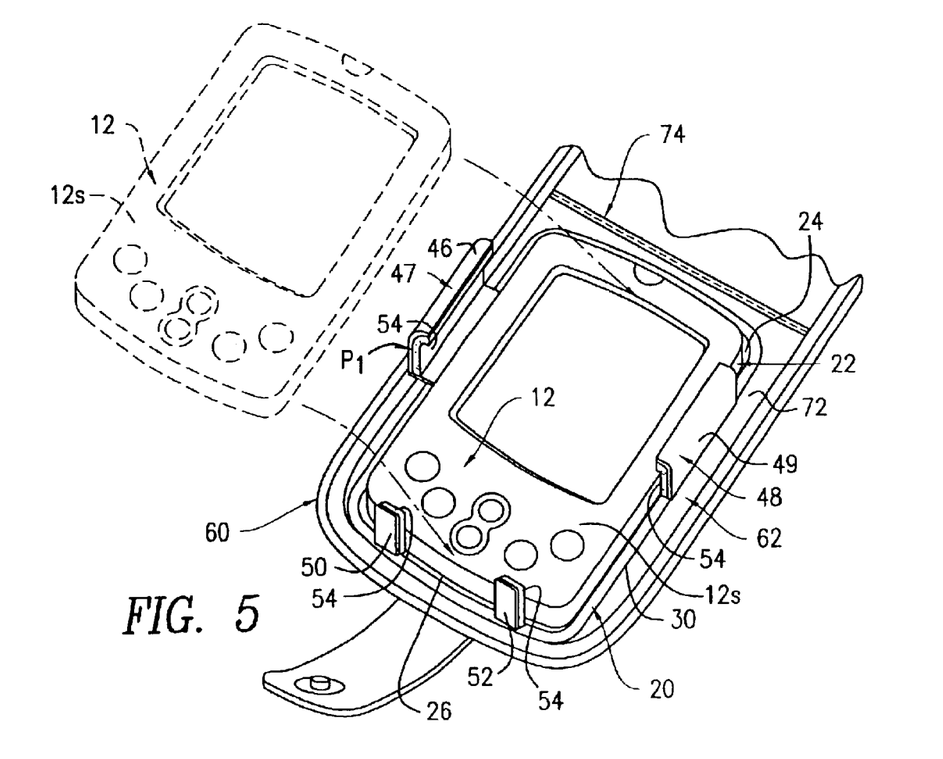
FIG. 5 is a perspective view of the PDA holding unit of the first embodiment of the present invention showing the attachment of a PDA unit with the use of the first gripping arm of the base member being in an extended position.

The PDA holding unit 20 also includes a first gripping arm 46 movably attached to the first side 28 of the base member 22 for engaging and holding the PDA device 12 in place on the base member 22; and a second gripping arm 48 attached to the second side 30 of the base member 22 for engaging and holding the PDA device 12 in place on the base member 22, as depicted in FIGS. 2 and 5. The first and second gripping arms 46 and 48 further include a curved upper edge section 47 and 49, respectively, for additional gripping and holding of the upper surface area 12s of the PDA device 12. The PDA holding unit 20 further includes third and fourth gripping arms 50 and 52 attached to the lower end 26 of the base member 22 for engaging and holding the PDA device 12 in place on the base member 22. The first, second, third, and fourth gripping arms 46, 48, 50, and 52 each include a friction pad 54 attached thereto, as shown in FIGS. 3 and 5 of the drawings. Base member 22, as depicted in FIG. 4, includes a leaf spring mechanism 56 having a leaf spring 58 attached thereto. The leaf spring 58 is connected to the first gripping arm 46 for moving the first gripping arm 46 between an extended position $P_1$ for receiving the PDA device 12 (see FIG. 5) and a gripping position $P_2$ for gripping and holding the PDA device 12 (see FIGS. 2 and 4) in place on the upper surface 34 of the base member 22.

As shown in FIGS. 1 to 3, the holding case 60 includes a first folding base section 62, a second folding cover section 64, and an integrally connected fold section 66 for connecting the base section 62 to the cover section 64, respectively. The base section 62 and the cover section 64 are foldable relative to each other in order to close the holding case 60 together, as depicted in FIG. 1. The base section 62 includes an inner wall surface 68 and an outer wall surface 70. The inner wall surface 68 includes a sleeve wall 72 for forming a sleeve pocket 74 on base section 62, as shown in FIG. 3. The sleeve wall 72 of base section 62 is attached to the base member 22 of PDA holding unit 20 by mounting fasteners 44 being received within mounting openings 42a to 42d therein of base member 22. The outer wall surface 70 includes a connecting strap or flap 76 attached to a lower end 78 of the base section 62 of holding case 60. Flap 76 includes a male closure snap 80 thereon for connecting the base section 62 to the cover section 64 in the process of closing the holding case 60, as shown in FIG. 1.

The cover section 64 includes an inner wall surface 82 and an outer wall surface 84. The inner wall surface 82, as shown in FIGS. 2 and 3, includes a first sleeve wall 86 and a second sleeve wall 88 for forming a first sleeve pocket 90 and a second sleeve pocket 92, respectively. The sleeve pockets 90 and 92 can be used to hold business cards, money or credit cards (not shown). The inner wall surface 82 also includes an elastic retaining strap 94 for holding the notepad 14 thereto. The outer wall surface 84 includes a female closure snap 96 attached to an upper end 98 of the cover section 64 of holding case 60. The female closure snap 96 receives the male closure snap 80 for closing the base section 62 relative to the cover section 64, as shown in FIG. 1, of holding case 60.

As shown in FIGS. 1 through 3, the fold section 66 includes an inner wall surface 100 and an outer wall surface 102. The inner wall surface 100 includes an elastic holding member 104 having a first sleeve holder 106 for receiving the stylus 18 therein and a second sleeve holder 108 for receiving the pen 16 therein, as depicted in FIG. 2 of the drawings.

Second Embodiment 200

Figure 6:
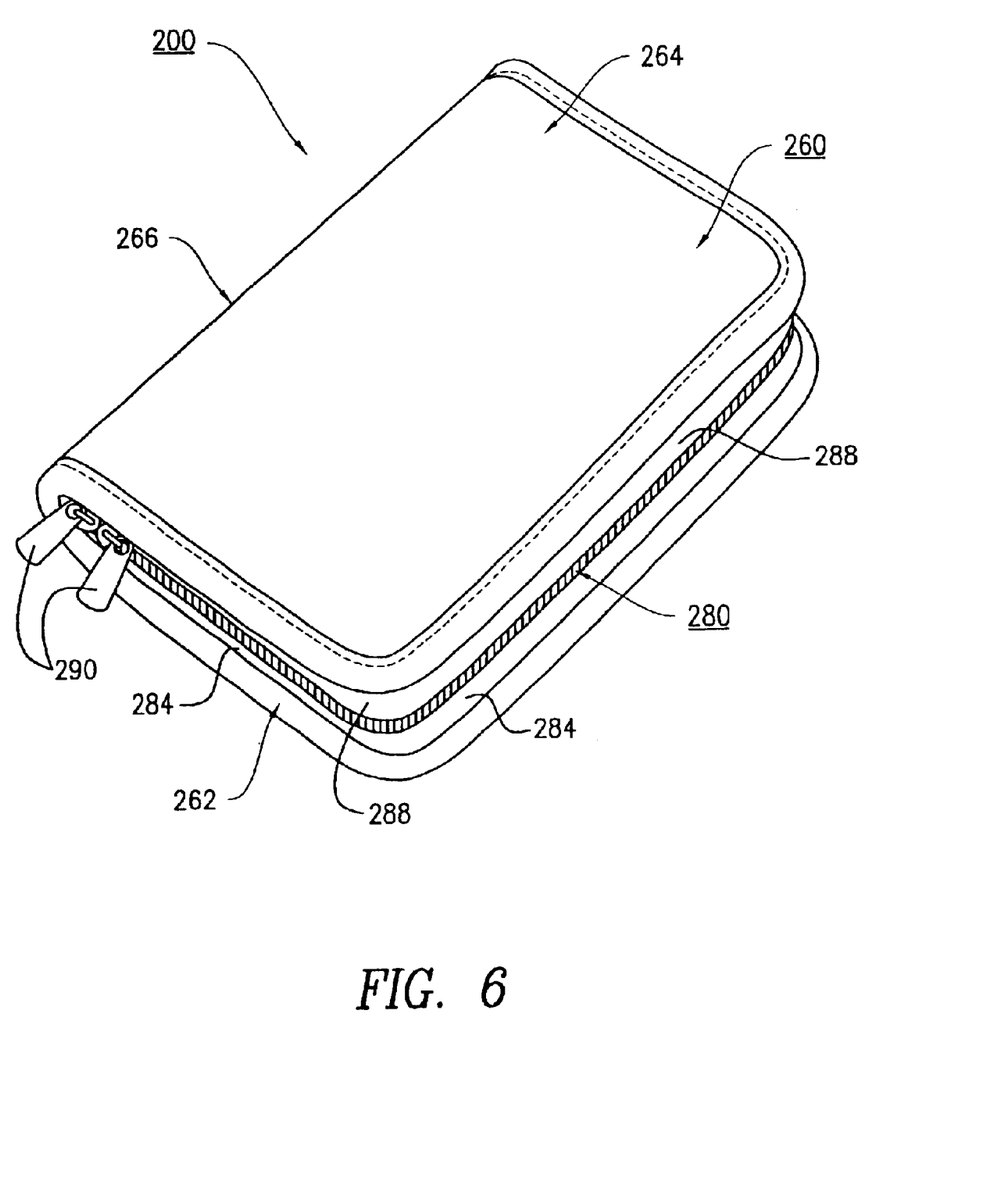
FIG. 6 is a perspective view of the PDA holding assembly of the second embodiment of the present invention showing the PDA holding assembly in a closed configuration.
Figure 7:
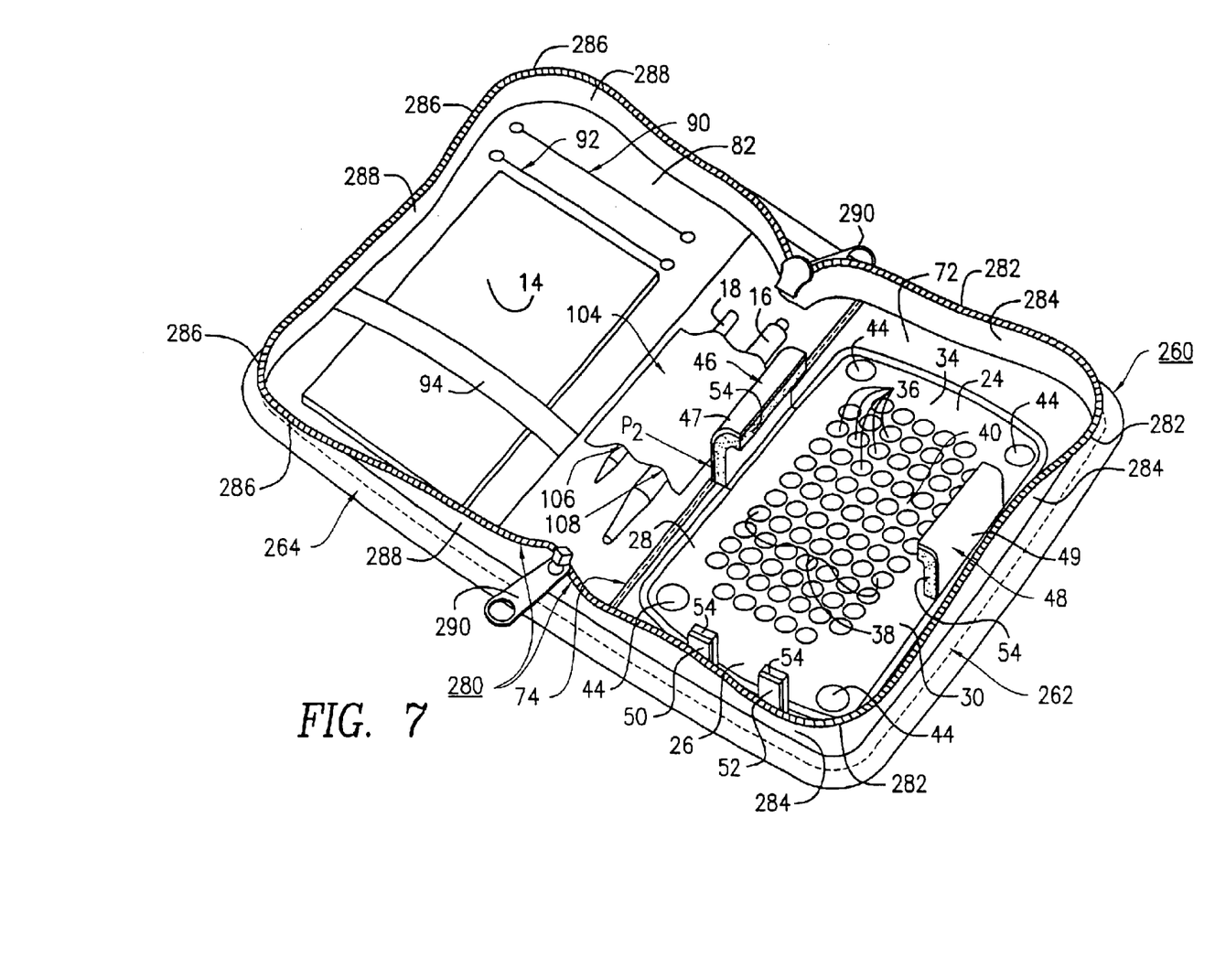
FIG. 7 is a perspective view of the PDA holding assembly of the present invention showing a PDA holding unit and a holding case in an opened configuration and in operational use thereof.
Figure 8:
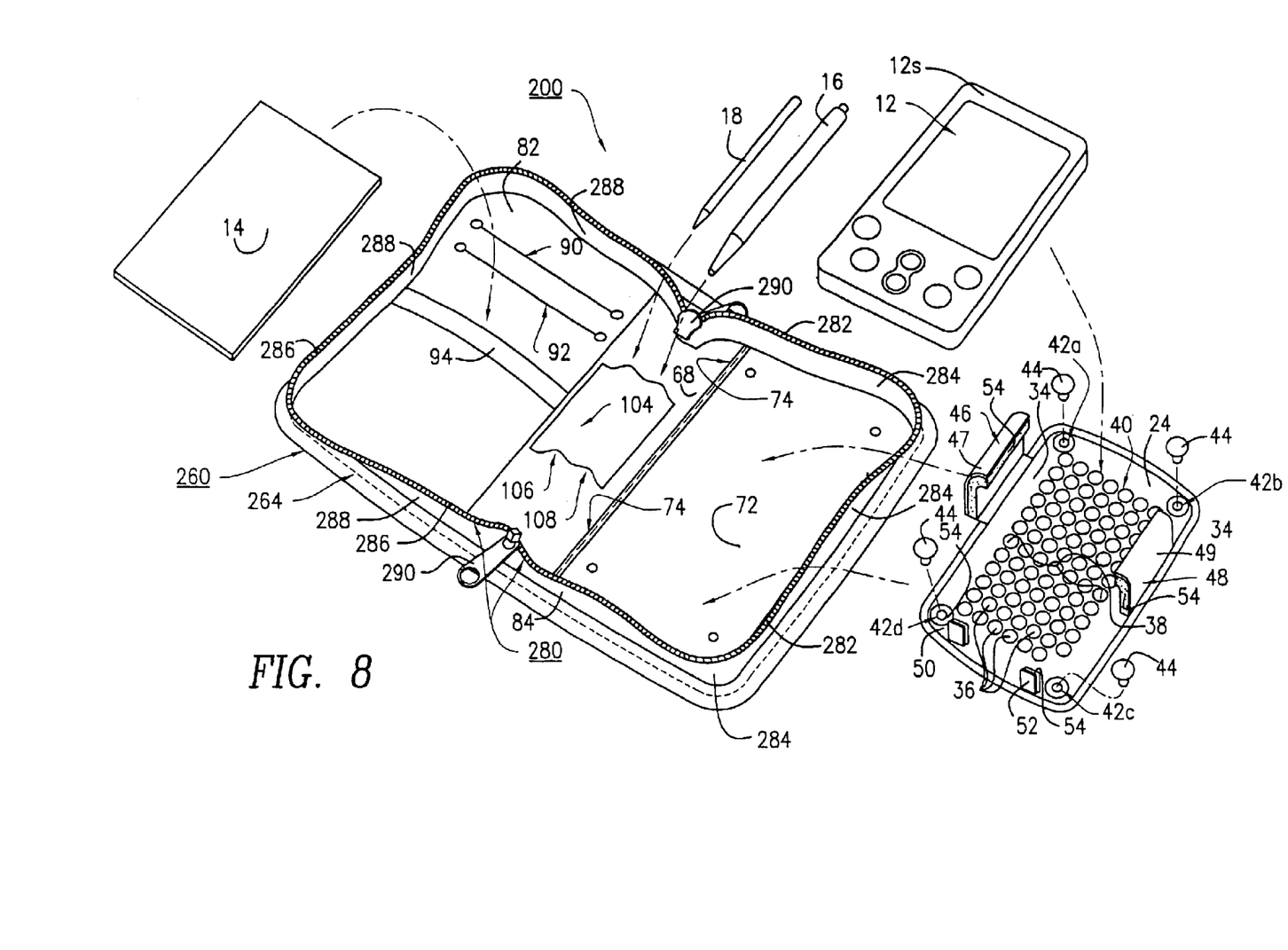
FIG. 8 is an exploded perspective view of the PDA holding assembly of the present invention showing the major component parts thereto.

The PDA holding assembly 200 and its component parts of the second embodiment of the present invention are represented in detail by FIGS. 6 through 9 of the patent drawings. All aspects of the second embodiment of the PDA holding assembly 200 are exactly the same as the first embodiment of the PDA holding assembly 10 except for the size, shape, and configuration of the holding case 260 which has a closure device in the form of a zipper 280 for closing together the base section 262 and the cover section 264 at the fold section 266, as depicted in FIG. 6. Also, the orientation of the PDA holding unit 220 within the base section 262 is in a side to side configuration with that of cover section 264, as shown in FIG. 7 of the drawings.

The zipper 280 includes a first zipper section 282 attached to a perimeter edge 284 of the base section 262 of holding case 260 and a second zipper section 286 attached to a perimeter edge 288 of the cover section 264 of holding case 260. The first and second zipper sections 282 and 286 are closed together by zipper locks 290.

In all other aspects, the PDA holding unit 220 is exactly the same as the PDA holding unit 20 of the first embodiment, except for its side to side orientation with that of the base section 262 relative to the cover section 264 within holding case 260, as previously mentioned.

OPERATION OF THE PRESENT INVENTION

Figure 9:
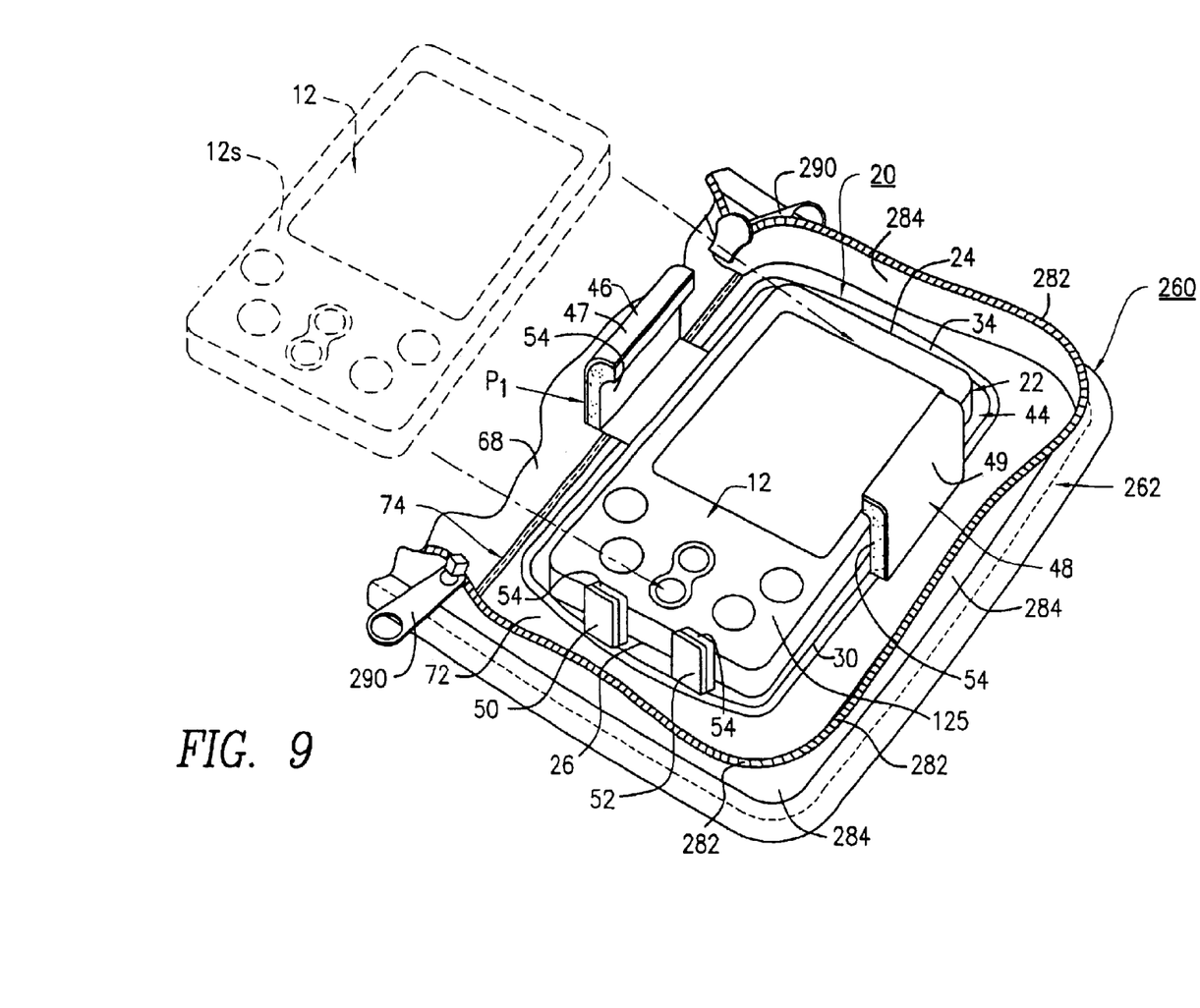
FIG. 9 is a perspective view of the PDA holding unit of the second embodiment of the present invention showing the attachment of a PDA unit with the use of the first gripping arm of the base member being in an extended position.

In operation, the PDA holding assemblies 10 and 100 of the present invention operate in the following manner, as shown in FIGS. 2, 5, 7, and 9 of the drawings. The user simply extends the movable first gripping arm 46 of PDA holding unit 20 to an extended position $P_1$, as shown in FIGS. 5 and 9, using his or her fingertips. The user then places the PDA device 12 on the non-slip gripping surface 40 of base member 22 of PDA holding unit 20. Next, the user releases his or her grip of the movable first gripping arm 46, such that the first gripping arm 46 automatically retracts via the leaf spring 58 of spring mechanism 56 and which moves the gripping arm 46 to the closed gripping position $P_2$ for gripping and holding the PDA device 12 in place on the upper surface 34 of base member 22 of PDA holding unit 20, as shown in FIGS. 2 and 7 of the drawings.

The user at his or her convenience can use the notepad 14, pen 16, and/or stylus 18 from the holding case 60 or 260. For example, the user simply extracts the stylus 18 from the first sleeve holder 106 or the pen 16 from the second sleeve holder 108. Additionally, the user can extract or insert business cards, money or credit cards (not shown) within sleeve pockets 74, 90, and/or 92 at the user's convenience.

ADVANTAGES OF THE PRESENT INVENTION

Accordingly, an advantage of the present invention is that it provides for a PDA holding assembly having a built-in PDA holding unit for securely holding in place a PDA (a personal digital assistant) unit within a carrying holding case.

Another advantage of the present invention is that it provides for a PDA holder unit having a base member with a moveable and extendable gripping arm and a non-moveable gripping arm for securing and holding the PDA unit within the gripping arms.

Another advantage of the present invention is that it provides for a PDA holding unit that includes a grid dot pattern of a plurality of gripping elements for forming a non-slip gripping surface on the upper surface of the base member in order to secure and protect the PDA unit being held within its holding case.

Another advantage of the present invention is that it provides for a PDA holding unit with gripping arms that each have a cushion pad thereon for protecting and stabilizing the PDA unit being held within its holding case.

Another advantage of the present invention is that it provides for a holding case that is capable of holding and securing office supplies and equipment within the holding case such as a notepad, a pen, and a stylus for the convenience of the user when using the PDA holding assembly and the PDA unit therein.

Another advantage of the present invention is that it provides for a carrying/holding case that is foldable and convenient to carry, and is closed by a flap closure or zipper closure.

A further advantage of the present invention is that it provides for a PDA holding assembly that is lightweight, durable, and easy to use.

A still further advantage of the present invention is that it provides for a PDA holding assembly that can be mass produced in an automated and economical means and is readily affordable by the user.

A latitude of modification, change, and substitution is indented in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A personal digital assistant (PDA) holding unit and holding case therefor, comprising:

a) a base member having an upper surface for receiving and holding a PDA device and a lower surface;

b) said upper surface having gripping elements thereon configured in a grid dot pattern and forming a non-slip gripping surface for frictionally engaging the PDA device;

c) a first gripping arm movably attached to a first side of said base member and movable in a horizontal plane for engaging and holding the PDA device in place on said base member; and a spring connected to said first gripping arm for moving said first gripping arm from an extended position for receiving different sizes of PDA devices to a gripping position for gripping and holding the PDA device in place on said upper surface of said base member;

d) a second gripping arm non-movably attached to a second side of said base member for engaging and holding the PDA device in place on said base member;

e) third and fourth gripping arms non-movably attached to one end of said base member for engaging and holding one end of the PDA device in place on said base member;

f) a holding case including at least a base section; and g) said lower surface of said base member being attached to said base section for holding said base member in place within said holding case.

2. A PDA holding unit in accordance with claim 1, wherein said holding case further includes a cover section;

said base section and said cover section being foldable relative to each other to close said holding case.

3. A PDA holding unit in accordance with claim 2, wherein said cover section of said holding case includes a pair of cover pockets.

4. A PDA holding unit in accordance with claim 2, wherein said cover section of said holding case includes an elastic retaining strap for holding a notepad thereto.

5. A PDA holding unit in accordance with claim 2, wherein said base section and said cover section of said holding case are connected by a fold section.

6. A PDA holding unit in accordance with claim 5, wherein said fold section of said holding case section includes an elastic holding member having a first holder for retaining a stylus therein and having a second for receiving a pen therein.

7. A PDA holding unit in accordance with claim 1, wherein said first, second, third, and fourth gripping arms each includes friction pads attached thereto.

8. A PDA holding unit in accordance with claim 1, wherein said holding case further includes a closure means for closing said holding case.

9. A PDA holding unit in accordance with claim 8, wherein said closure means is a zipper for closing said holding case.

10. A PDA holding unit in accordance with claim 8, wherein said closure means is a flap for closing said holding case.

11. A PDA holding unit in accordance with claim 1, wherein said base section of said holding case includes a base pocket.

12. A PDA holding unit in accordance with claim 1, wherein said spring is positioned on said lower surface of said base member relative to said base section.

13. A PDA holding unit in accordance with claim 12, wherein said spring is a leaf spring positioned on said lower surface of said base member.

14. A PDA holding unit in accordance with claim 1, wherein said first and second gripping arms each include a curved upper edge section for additional gripping and holding of an upper surface area of the PDA device.

15. A PDA holding unit in accordance with claim 1, wherein said first gripping arm is substantially L-shaped in configuration.

16. A PDA holding unit in accordance with claim 1, wherein said second gripping arm is substantially L-shaped in configuration.

17. A PDA holding unit in accordance with claim 1, wherein each of said third and fourth gripping arms is substantially rectangular in shape.

* * * * *